(12) United States Patent
Kudou et al.

(10) Patent No.: US 6,717,306 B1
(45) Date of Patent: Apr. 6, 2004

(54) CORELESS MOTOR

(75) Inventors: Mitugu Kudou, Tokyo (JP); Shouhei Kawai, Tokyo (JP)

(73) Assignee: Namiki Seimitsu Hoseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/958,332

(22) PCT Filed: Apr. 5, 2000

(86) PCT No.: PCT/JP00/02193

§ 371 (c)(1),
(2), (4) Date: Jan. 2, 2002

(87) PCT Pub. No.: WO00/60725

PCT Pub. Date: Oct. 12, 2000

(30) Foreign Application Priority Data

Apr. 6, 1999 (JP) ............................................. 11/98334

(51) Int. Cl.⁷ ................................................ H02K 7/06
(52) U.S. Cl. ........................................... 310/81; 310/90
(58) Field of Search .............................. 310/81, 89, 90, 310/154.12, 154.13

(56) References Cited

U.S. PATENT DOCUMENTS 4,806,025 A  *  2/1989  Kamiyama et al. ......... 267/163
5,559,382 A  *  9/1996  Oku et al. ................. 310/67 R
5,874,794 A  *  2/1999  Trammell et al. ............. 29/596
5,889,349 A  *  3/1999  Yasuda ........................ 310/261

FOREIGN PATENT DOCUMENTS

| JP | 54-141309 U |   | 10/1979 |   |
|----|-------------|---|---------|---|
| JP | 54-141309   | * | 10/1979 |   |
| JP | 58-29361    | * | 8/1981  | .......... H02K/21/06 |
| JP | 62-203538 A |   | 9/1987  |   |
| JP | 9-23628 A   |   | 1/1997  |   |

* cited by examiner

Primary Examiner—Dang Le
Assistant Examiner—Nguyen N Hanh
(74) Attorney, Agent, or Firm—Eric J. Robinson

(57) ABSTRACT

A highly precise coreless motor with improved precision of assembly in which weight is reduced by reducing the metal parts and reduction of assembly processes and time by means of a smaller number of parts brings down costs. There is a cylindrical external housing 1 with a through hole 1c in a central position in the closed end. A molded resin body 3 is molded into place through the through hole 1c of the external housing 1; one end is a bearing 3a that supports the rotating shaft, and it continues on the coaxial position of the rotating shaft to become a bearing housing 3b that is fitted into place. The molded resin body 3 is the base on which both the rotor and the stator are assembled.

25 Claims, 4 Drawing Sheets

CORELESS MOTOR

BACKGROUND OF THE INVENTION

1. Field of the Invention

This invention concerns improvement of cylindrical coreless ms vibration alarm of the silent call type, by means of vibration.

2. Description of Related Art

In the past, coreless motors of this type have an eccentric weight W attached to a rotating shaft 11 that projects outside a housing 10, as shown in FIG. 5.

Such a coreless motor has a cylindrical external housing 10 that is reduced to a small-diameter cylinder at one end. The rotating shaft 11, one end of which projects outside the external housing 10 from the small diameter cylinder end, passes through the central axis of the external housing 10, and passes through and is supported by a bearing 12 fitted inside the small-diameter cylinder end, so that the rotating shaft 11 is free to rotate.

Moreover, a magnet 13 is fitted around and fixed to the outside of a bearing housing 14. This bearing housing 14 is fitted on the coaxial position of the rotating shaft 11, and holds a separate bearing 15 that is on the coaxial position of the rotating shaft 11. A cylindrical coil 16 is assembled to accommodate within the inside diameter the magnet 13, separated by a magnetic gap G. The coil 16 is held by a coil holder 17 that is mounted on the coaxial position of the rotating shaft 11 that extends beyond the bearing 15.

Beyond that, a commutator mechanism is assembled of a commutator element 18a mounted on the coil holder 17, and a brush 18c that is held by a brush holder 18b. An end cap 19 is attached, which acts to hold in place the end of the magnet 13 that is fitted around the outside of the bearing housing 14, and to hold in place the end of the coil 16 that is held on the coaxial position of the rotating shaft 11.

Because this coreless motor is made up primarily of metal parts, it is heavy, and because there are many parts, the assembly involves many processes, and requires much time. That is linked to high costs, and there is also a problem of precision because of the number of parts to be assembled.

SUMMARY OF THE INVENTION

The goals of this invention are to reduce weight by reducing the metal parts, and to reduce costs by reducing assembly processes and time by means of a smaller number of parts, thus providing a highly precise coreless motor with improved precision of assembly.

In the coreless motor of this invention, there is a cylindrical external housing with a through hole in a central position in the closed end. A molded resin body is molded into place through the through hole of the external housing; one end is a bearing that supports the rotating shaft, and it continues on the coaxial position of the rotating shaft to become a bearing housing that is fitted into place. The molded resin body is the base on which both the rotor and the stator are assembled.

Further, in the coreless motor of this invention, there are concave notches in the end of the bearing housing, and there is a hold-down collar that has on its inner diameter protrusions that mate with the notches in the bearing housing. The stator is assembled with the magnet held down by this hold-down collar that at the same time meshes the magnet with the periphery of the bearing housing.

Moreover, in the coreless motor of this invention, there is a bearing that has an oil reserve that lubricates the inner surface of the through hole through which the rotating shaft passes.

DETAILED DESCRIPTION OF THE INVENTION

Figure 1:
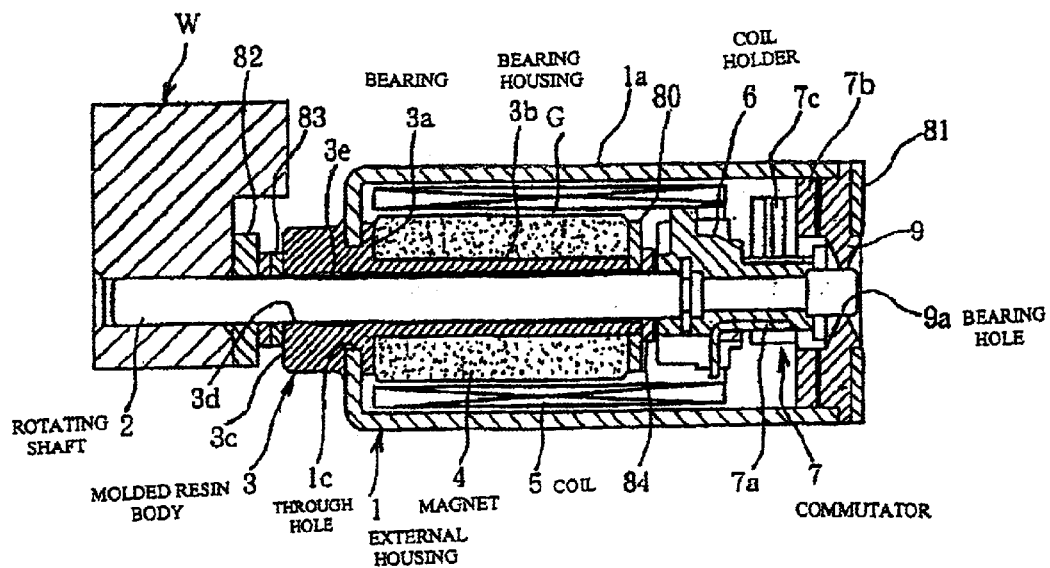
FIG. 1 is a side section of the coreless motor of this invention.
Figure 6:
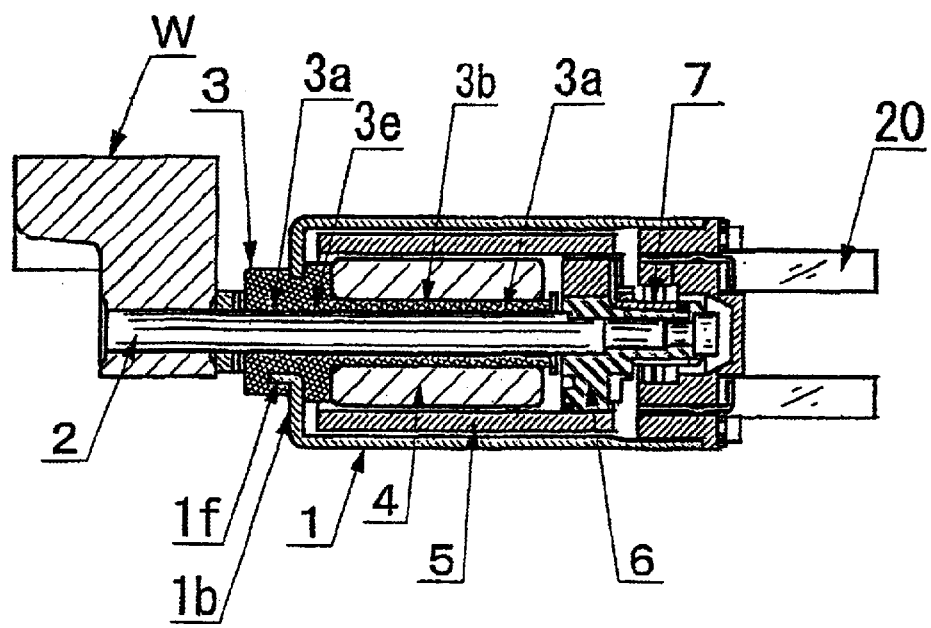
FIG. 6 is a side section showing another embodiment of the coreless motor of this invention.

To explain below with reference to the attached drawings, the embodiments shown in FIGS. 1 and 6 represent a coreless motor that has an eccentric weight W on the end of the rotating shaft 2 that projects outside the external housing 1, and is used to constitute a vibrating ringer type of vibrating alarm device.

This coreless motor has an external housing 1, a rotating shaft 2, a bearing 3a, a bearing housing 3b, a magnet 4, a cylindrical coil 5, a coil holder 6, and a commutator mechanism 7. From these are assembled a rotor with the coil 5 supported on the coaxial position of the rotating shaft 2, and a stator with the magnet 4 fitted around and fixed to the bearing housing 3b.

The external housing 1 is made of metal, and has a cylindrical housing body 1a with a simple structure that is closed at one end; there is a through hole 1c that is needed so that a molded resin body to be described below can be molded in place in a central position in the closed face 1b. The rotating shaft 2 is located on the central axis of the external housing 1, and penetrates it with one end projecting outside to hold the eccentric weight W.

Figure 2:
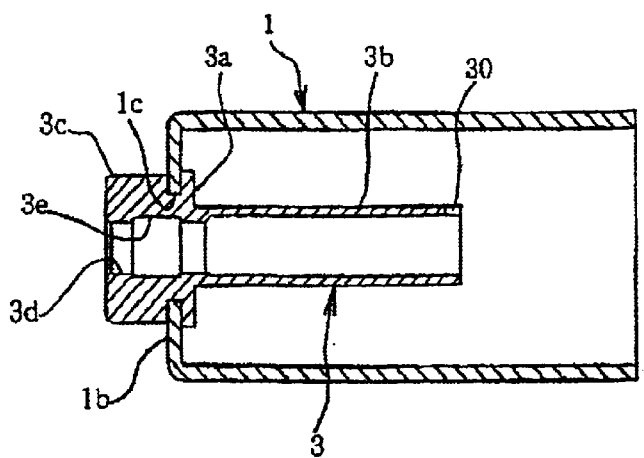
FIG. 2 is a side section showing the external housing and molded resin body used in the coreless motor of this invention.

As shown in FIG. 2, there is a molded resin body molded in place through the a through hole 1c, which is continuous on the outside and inside of the closed face. It is no preferable that this molded resin body 3 be molded of a polymer material with good lubricity, specifically, a liquid crystal polymer with good moldability or a hard PPS resin is desirable. The invention is not limited by that point, however.

This molded resin body comprises a bearing 3a on one end that supports the rotating shaft 2 so that it is free to turn, and a bearing housing 3b that is fitted on the coaxial position of the rotating shaft, molded continuously in a single piece. The structure of this molded resin piece 3 is formed by molding the parts inside and outside the closed face, with the bearing 3a passing through the through hole 1c. The portion that projects outside through the through hole 1c is molded as a projecting flange 3c that receives the eccentric weight W. FIG. 1 shows an extension W' to the eccentric weight W having the same outside diameter as the eccentric weight W and an inside profile that avoids striking a projection 3c of the molded resin body 3 and bearing 3a. FIG. 1 also shows a first length of the extension W' being a shorter measurement than a second length parallel to a central axis of the cylindrical projection 3c of the molded resin body 3 that projects beyond the end of the external housing 1.

Because the body is formed of a polymer material with good lubricity from the bearing 3a on to the bearing housing 3b, the bearing hole 3d should be formed with a diameter that allows it to support the penetrating rotating shaft 2 so that it can rotate. Because of that, there is no need to maintain a large clearance between the bearing hole 3d and the rotating shaft 2, and so the motor as a whole can be slimmer. Moreover, by lengthening the bearing span as shown in FIG. 6, it is possible to support with greater stability the rotating shaft 2 that penetrates and is supported.

So that the rotating shaft 2 can rotate more smoothly, it is desirable to have an oil reserve 3e as shown in FIGS. 1, 2 and 6, to lubricate the inner surface of the bearing hole 3d for the rotating shaft 2.

Figure 3:
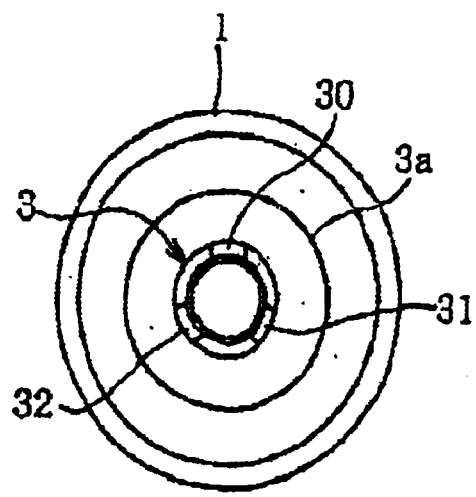
FIG. 3 is an end view showing the external housing in FIG. 2 and the collar that holds down the molded resin body in the open end of the external housing.
Figure 4:
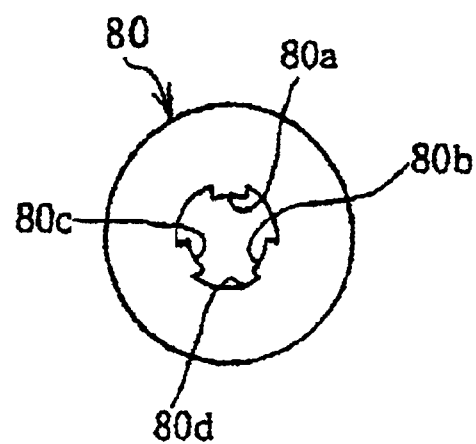
FIG. 4 is a front view showing the magnet hold-own collar used in the coreless motor of this invention.
Figure 5:
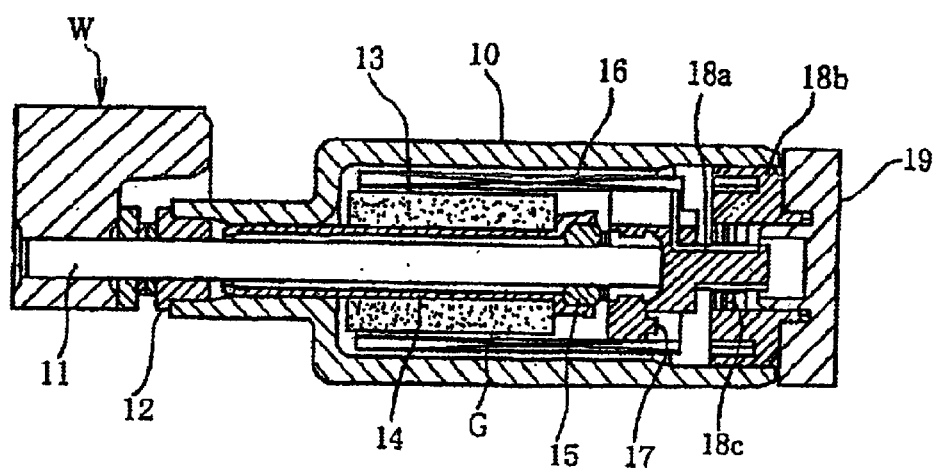
FIG. 5 is a side section showing the conventional coreless motor.

As shown in FIGS. 2 and 3, there are multiple notches 30, 31, 32, which are concave in shape, cut at designated intervals around the edge of one end of the bearing housing 3b. As shown in FIG. 4, the hold-own collar 80 has, around the inside of the aperture 80d that matches the outer edge of the bearing housing 3b, multiple tabs 80a, 80b, 80c that mesh with the notches 30, 31, 32 of the bearing housing 3b.

The magnet 4 is fitted and fixed to the outer periphery of the bearing housing 3b. This magnet 4 is assembled so that it is kept from turning by the hold-down collar 80 that is meshed with and fixed to the outer edge of the end of the bearing housing 3b, by means of the meshing aperture 80d. The hold-down collar 80 itself is fixed in place and stopped from turning by means of its tabs 80a, 80b, 80c meshing with the notches 30, 31, 32 of the bearing housing 3b.

The magnet 4 is accommodated within the diameter of the cylindrical coil 5, and separated from it by a magnetic gap G. This coil 5 is held on a coil holder 6 that is mounted on the coaxial position of the rotating shaft 2. There is a commutator element 7a on the coil holder 6; the commutator mechanism 7 is assembled by pressing brush 7c, which is held out by brush holder 7b, against this commutator element 7a.

The commutator mechanism 7 is assembled so that current can be conducted by means of leads (not illustrated) that extend out beyond the hold-down collar through the end cap 81. Because the coil side, as the rotor, and the magnet side as the stator are assembled in this way, it is possible to constitute a coreless motor capable of producing vibrations by rotating the rotating shaft 2 which has the eccentric weight W attached.

Because the coreless motor constituted in this way has a bearing 3a for the rotating shaft 2 and a bearing housing 3b formed in one piece as the molded resin body 3, the motor as a whole is made lighter. And because the coreless motor constituted in this way has a bearing 3a for the rotating shaft 2 and a bearing housing 3b formed in one piece as the molded resin body 3, the number of parts can be reduced and the precision of assembly can be improved by using the molded resin body 3 as the basis for assembly of the rotor and the stator.

In addition, the coreless motor shown in FIG. 1 has, in addition to the parts mentioned above, a bearing 9 that is located between the brush holder 7b and the end cap 81, which supports the other end of the rotating shaft 2 so that it can turn freely. This bearing 9 can be molded of a polymer material, perhaps the same material used for the molded resin body 3, and the bearing hole 9a preferably is molded with a taper so that the rotating shaft 2 is supported by and turns easily in the bearing 9 with little contact resistance.

Besides that, there is a spacer 83 located between the hold-down ring 82 of the eccentric weight W and the projecting flange 3c of the molded resin body 3; this allows the eccentric weight W to rotate with good stability against the projecting flange 3c of the molded resin body 3. Further, there is a spacer 84 located between the hold-down collar 80 that holds down the magnet 4 and the coil holder 6, so that the coil holder 6 can rotate with good stability.

Figure 7:
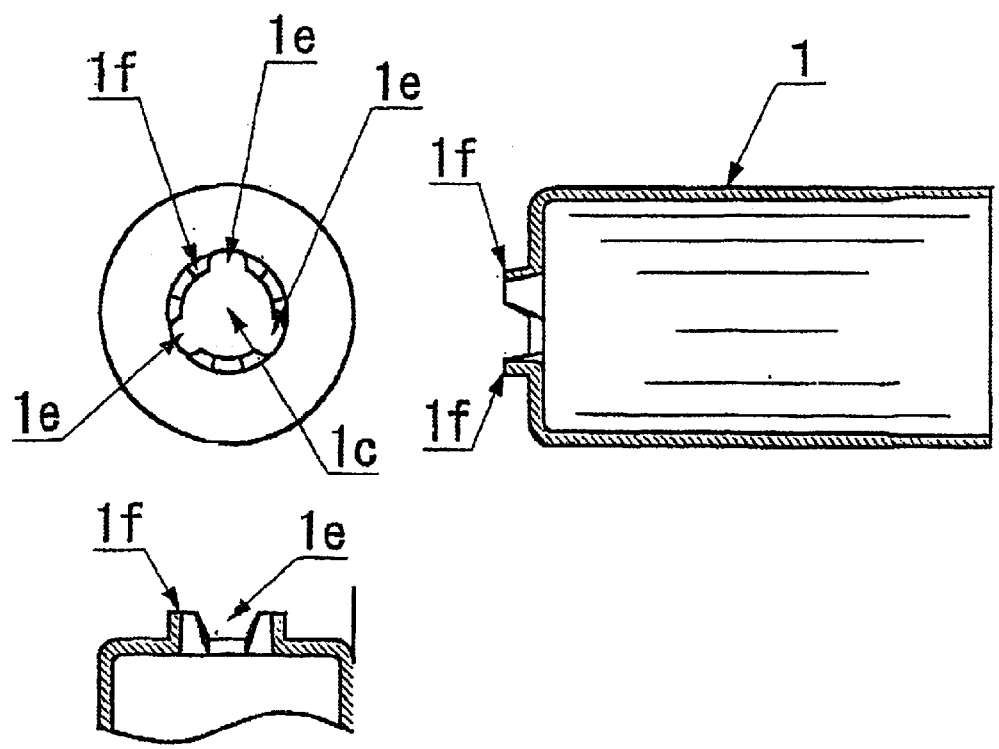
FIG. 7 is a side section showing the shape of the external housing of the coreless motor of this invention.

In the example of a coreless motor shown in FIG. 6, the external housing 1 has me shape shown in FIG. 7. This coreless motor has a cylindrical external housing with one closed end, with a through hole 1c in a central position in the closed face that is penetrated by the rotating shaft 2, which lies on the central axis of the coreless motor. The shape of the edge of the through hole in the external housing 1 consists of multiple concave notches 1e along the edge of the through hole, separated by multiple projecting (convex) anchors 1f, also along the edge of the through hole, that project outward from the external housing, parallel to the central axis. A molded resin body 3, molded in place passing through the through hole 1c of the external housing 1, has on one end a bearing 3a that supports the rotating shaft 2 and on the other end a bearing housing 3b mounted on the coaxial position of the bearing 3a and the rotating shaft 2, with both ends molded as a single piece. The rotor and stator of the coreless motor are each assembled on the basis of this molded resin body that is unified with the external housing 1. In this way, the external housing 1 and the molded resin body 3 can be firmly bonded with no play between them, and there is no problem with looseness or shakiness in the direction of rotation, or course, or even in the axial direction.

Now, the process of forming the external housing 1, the concave notches of the through hole at one end of the external housing, and the projecting (convex) anchors 1f located between the notches and parallel to the central axis, can be unitary forming using an extrusion press, thus reducing the processing cost.

Industrial Utility

In the coreless motor of this invention, as stated above, there is a cylindrical external housing with a through hole in a central position in the closed end. A molded resin body is molded into place through the through hole of the external housing; one end is a bearing that supports the rotating shaft, and it continues on the coaxial position of the rotating shaft to become a bearing housing that is fitted into place. The molded resin body is the base on which both the rotor and the stator are assembled. By this means, the weight of the motor as a whole is reduced; the number of parts is also reduced, making it possible to increase the precision of assembly.

In addition, because the body is formed of a polymer material with good lubricity from the bearing on to the bearing housing, the bearing hole can be formed with a diameter that allows it to support the penetrating rotating shaft so that it can rotate. Because of that, there is no need to maintain a large clearance between the bearing hole and the rotating shaft, and so the motor as a whole can be slimmer. Moreover, by lengthening the bearing span, it is possible to support with greater stability the rotating shaft that penetrates and is supported.

Further, in the coreless motor of this invention, there are concave notches in the end of the bearing housing, and there is a hold-down collar that has on its inner diameter protrusions that mate with the notches in the bearing housing. The stator is assembled with the magnet held down by this hold-down collar that at the same times meshes the magnet with the periphery of the bearing housing.

Moreover, in the coreless motor of this invention, there is a bearing that has an oil reserve that lubricates the inner surface of through hole through which the rotating shaft passes, and thus supports the rotating shaft and enables it to turn smoothly.

What is claimed is:

1. A coreless motor comprising:

an external housing with a central axis, a closed end, and a through hole located at a center of the closed end, a rotating shaft that penetrates the external housing and is located on the central axis of the external housing, a magnet that is fitted and fixed to an outer periphery of the bearing housing, a cylindrical coil that accommodates the magnet within a diameter of the cylindrical coil and is separated from the magnet by a magnetic gap, a coil holder that supports the coil on a coaxial position of the rotating shaft, a commutator mechanism with a coil side and a magnet side wherein the coil side is supported on the coaxial position of the rotating shaft as a rotor and the magnet side is fitted and fixed to the outer periphery of the bearing housing as a stator, and a molded resin body comprising a bearing that supports the rotating shaft so that the shaft is free to turn within the external housing, and a bearing housing that is fitted to the rotating shaft and located along the central axis, wherein said molded resin body is molded in place through the through hole in the external housing, is molded as a single continuous piece that forms said bearing and said bearing housing, and is a base upon which both the stator and the rotor are assembled.

2. The coreless motor as described in claim 1, further comprising:

first concave notches on the outer periphery of the bearing housing, and a hold-down collar with tabs on an inner periphery of the bearing housing that mesh with the notches on the outer periphery of the bearing housing, wherein the magnet and the hold-down collar hold the magnet in place as the stator.

3. The coreless motor as described in claim 2, wherein the center of the closed end of the external housing is penetrated by the rotating shaft centered on the central axis, and wherein an edge of the through hole in the external housing has second concave notches around the through hole separated by multiple projecting convex tabs.

4. The coreless motor as described in claim 2, wherein a portion of the molded resin body is located outside the through hole in the end of the external holding, wherein the portion projects beyond the end of the external housing, and wherein the portion forms a long cylinder parallel to the central axis.

5. The coreless motor as described in claim 2, further comprising:

an oil reserve that is formed in an inner surface of the molded resin body.

6. The coreless motor as described in claim 2, further comprising:

an eccentric weight in the shape of a partial cylinder which is attached to the end of the rotating shift to constitute a vibrating motor of the silent call type.

7. The coreless motor as described in claim 2, further comprising:

an eccentric weight in the shape of a partial cylinder, and an extension to the eccentric weight having the same outside diameter as the eccentric weight and an inside profile that avoids striking a projection of the molded resin body and bearing, a first length of the extension being a shorter measurement than a second length parallel to a central axis of the cylindrical projection of the molded resin body that projects beyond the end of the external housing.

8. The coreless motor as described in claim 1, wherein the center of the closed end of the external housing is penetrated by the rotating shaft centered on the central axis, and wherein an edge of the through hole in the external housing has second concave notches around the through hole separated by multiple projecting convex tabs.

9. The coreless motor as described in claim 8, wherein the second concave notches of the through hole are at one end of the external housing, and the projecting convex tabs are located between the second concave notches and parallel to the central axis, and wherein the second concave notches and the projecting convex tabs are unitarily formed using an extrusion press.

10. The coreless motor as described in claim 9, further comprising:

an eccentric weight in the shape of a partial cylinder which is attached to the end of the rotating shaft to constitute a vibrating motor of the silent call type.

11. The coreless motor as described in claim 9, further comprising:

an eccentric weight in the drape of a partial cylinder, and an extension to the eccentric weight having the same outside diameter as the eccentric weight and an inside profile that avoids striking a projection of the molded resin body and bearing, a first length of the extension being a shorter measurement than a second length parallel to a central axis of the cylindrical projection of the molded resin body that projects beyond the end of the external housing.

12. The coreless motor as described in claim 8, wherein a portion of the molded resin body is located outside the through hole in the end of the external housing, wherein the portion projects beyond the end of the external housing, and wherein the portion forms a long cylinder parallel to the central axis.

13. The coreless motor as described in claim 12, wherein the second concave notches of the through hole are at one end of the external housing, and the projecting convex tabs are located between the second concave notches and parallel to the central axis, and wherein the second concave notches and the projecting convex tabs are unitarily formed using an extrusion press.

14. The coreless motor as described in claim 8, further comprising:

an oil reserve that is formed in an inner surface of the molded resin body.

15. The coreless motor as described in claim 8, further comprising:

an eccentric weight in the shape of a partial cylinder which is attached to the end of the rotating shaft to constitute a vibrating motor of the silent call type.

16. The coreless motor as described in claim 8, further comprising:

an eccentric weight in the shape of a partial cylinder, and an extension to the eccentric weight having the same outside diameter as the eccentric weight and an inside profile that avoids striking a projection of the molded resin body and bearing, a first length of the extension being a shorter measurement than a second length parallel to a central axis of the cylindrical projection of the molded resin body that projects beyond the end of the external housing.

17. The coreless motor as described in claim 1, wherein a portion of the molded resin body is located outside the through hole in the end of the external housing, whereint the portion projects beyond the end of the external housing, and wherein the portion forms a long cylinder parallel to the central axis.

18. The coreless motor as described in claim 17, further comprising:

an eccentric weight in the shape of a partial cylinder which is attached to the end of the rotating shaft to constitute a vibrating motor of the silent call type.

19. The coreless motor as described in claim 17, further comprising:

an eccentric weight in the shape of a partial cylinder, and an extension to the eccentric weight having the same outside diameter as the eccentric weight and an inside profile that avoids striking a projection of the molded resin body and bearing, a first length of the extension being a shorter measurement than a second length parallel to a central axis of the cylindrical projection of the molded resin body that projects beyond the end of the external housing.

20. The coreless motor as described in claim 1, further comprising:

an oil reserve that is formed in an inner surface of the molded resin body.

21. The coreless motor as described in claim 20, further comprising:

an eccentric weight in the shape of a partial cylinder which is attached to the end of the rotating shaft to constitute a vibrating motor of the silent call type.

22. The coreless motor as described in claims 20, further comprising:

an eccentric weight in the shape of a partial cylinder, and an extension to the eccentric weight having the same outside diameter as the eccentric weight and an inside profile that avoids striking a projection of the molded resin body and bearing, a first length of the tension being a shorter measurement and a second length parallel to a central axis of the cylindrical projection of the molded resin body that projects beyond the end of the external housing.

23. The coreless motor as described in claim 1, further comprising:

an eccentric weight in the shape of a partial cylinder which is attached to the end of the rotating shaft to constitute a vibrating motor of the silent call type.

24. The coreless motor as described in claim 23, further comprising:

an extension to the eccentric weight having the same outside diameter as the eccentric weight and an inside profile that avoids striking a projection of the molded resin body and bearing, a first length of the extension being a shorter measurement than a second length parallel to a central axis of the cylindrical projection of the molded resin body that projects beyond the external housing.

25. The coreless motor as described in claim 1, further comprising:

an eccentric weight in the shape of a partial cylinder, and an extension to the eccentric weight having the same outside diameter as the eccentric weight and an inside profile that avoids striking a projection of the molded resin body and bearing, a first length of the extension being a shorter measurement than a second lenth parallel to a central axis of the cylindrical projection of the molded resin body that projects beyond the end of the external housing.

\* \* \* \* \*